United States Patent
Ohshima (10) Patent No.: US 12,470,668 B2
(45) Date of Patent: Nov. 11, 2025

(54) COMMUNICATION APPARATUS AND CONTROL METHOD THEREFOR

(71) Applicant: CANON KABUSHIKI KAISHA, Tokyo (JP)

(72) Inventor: Hideaki Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 18/614,318

(22) Filed: Mar. 22, 2024

(65) Prior Publication Data
US 2024/0323317 A1    Sep. 26, 2024

(30) Foreign Application Priority Data

Mar. 23, 2023  (JP) .................. 2023-046970

(51) Int. Cl.
H04N 7/04      (2006.01)
H04N 5/91      (2006.01)

(52) U.S. Cl.
CPC .................. *H04N 7/04* (2013.01); *H04N 5/91* (2013.01)

(58) Field of Classification Search
CPC ........ H04N 7/04; H04N 5/91; H04N 1/00127; H04N 9/8211; H04N 5/765; G11B 27/031
See application file for complete search history.

(56) References Cited

U.S. PATENT DOCUMENTS

| | | | | |
|---|---|---|---|---|
| 6,583,809 B1* | 6/2003 | Fujiwara | ........... | H04L 12/40058 348/E7.079 |
| 2010/0217897 A1* | 8/2010 | Kitagawa | ............ | H04W 12/033 710/33 |
| 2020/0336694 A1* | 10/2020 | Takahashi | ................ | H04N 5/76 |

FOREIGN PATENT DOCUMENTS

JP         6594371 B2    10/2019

* cited by examiner

*Primary Examiner* — Gevell V Selby
(74) *Attorney, Agent, or Firm* — Canon U.S.A., Inc. IP Division (57) ABSTRACT

A communication apparatus generates second data to be associated with first data being stored. The apparatus controls transfer of data that is registered or managed as a transfer target to an external apparatus, wherein the apparatus can execute immediate transfer in which the second data and the first data to be associated with the second data are transferred to an external apparatus in response to generation of the second data as a transfer target. When executing the immediate transfer, if the first data to be associated with the second data is not a transfer target, the apparatus sets the first data as a transfer target and then transfers the first data together with the second data to the external apparatus.

11 Claims, 8 Drawing Sheets

COMMUNICATION APPARATUS AND CONTROL METHOD THEREFOR

BACKGROUND

Field of the Disclosure

The present disclosure relates to a communication apparatus and a control method for the same and particularly relates to a technique for transferring data to an external device.

Description of the Related Art

A data generating apparatus such as an image capture apparatus includes a function for transferring generated data to an external apparatus. Also, a known data generating apparatus (Japanese Patent No. 6594371) includes a function for associating newly generated data with existing generated data, for example, associating newly recorded audio data with stored image data.

When the data is transferred to an external apparatus, problems may arise in how to handle other data associated with the data to be transferred. In Japanese Patent No. 6594371, when associating audio data with image data, control is performed so that whether or not to manage the associated audio data as a transfer target depends on whether or not the image data is managed as a transfer target.

In the control method of Japanese Patent No. 6594371, in a case where image data with associated audio data is not managed as a transfer target, neither the audio data nor the image data is managed as a transfer target. Accordingly, in a case where the image data is not managed as a transfer target, the image data and the associated audio data need to be re-registered as data to be transferred. Thus, there is room for improvement in terms of user-friendliness in the case of wanting to associate audio data with image data and immediately transfer them.

SUMMARY

Aspects of the present disclosure provide a communication apparatus and a control method that, when new data is associated with stored data, enable both pieces of data to be immediately transferred to an external apparatus irrespective of whether or not the stored data is being managed as data to be transferred.

According to an aspect of the present disclosure, there is provided a communication apparatus comprising: one or more processors that execute computer-executable instructions stored in a memory and thereby function as: a generating unit configured to generate second data to be associated with first data being stored; and a controlling unit configured to control transfer of data that is registered or managed as a transfer target to an external apparatus, wherein the controlling unit can execute immediate transfer in which the second data and the first data to be associated with the second data are transferred to an external apparatus in response to generation of the second data as a transfer target by the generating unit, and when executing the immediate transfer, if the first data to be associated with the second data is not a transfer target, sets the first data as a transfer target and then transfers the first data together with the second data to the external apparatus.

According to another aspect of the present disclosure, there is provided a control method executed by a communication apparatus, the control method comprising: generating second data to be associated with first data being stored; and controlling transfer of data that is registered or managed as a transfer target to an external apparatus, wherein the controlling includes executing immediate transfer in which the second data and the first data to be associated with the second data are transferred to an external apparatus in response to generation of the second data as a transfer target by the generating unit, and when executing the immediate transfer, if the first data to be associated with the second data is not a transfer target, setting the first data as a transfer target and then transferring the first data together with the second data to the external apparatus.

According to a further aspect of the present disclosure, there is provided a non-transitory computer-readable medium storing computer-executable instructions which, when executed by one or more processors equipped in an electronic device, cause the electronic device to function as a communication apparatus comprising: a generating unit configured to generate second data to be associated with first data being stored; and a controlling unit configured to control transfer of data that is registered or managed as a transfer target to an external apparatus, wherein the controlling unit can execute immediate transfer in which the second data and the first data to be associated with the second data are transferred to an external apparatus in response to generation of the second data as a transfer target by the generating unit, and when executing the immediate transfer, if the first data to be associated with the second data is not a transfer target, sets the first data as a transfer target and then transfers the first data together with the second data to the external apparatus.

Further features of various embodiments will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of every embodiment. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

Note that the embodiments described below implement a digital camera. However, in some embodiments, an image capture function is not required. Also, the type of data is not limited to image data and audio data. Some embodiments can be implemented as any electronic device with a function for associating new data (second data) with stored data (first data) and a function for transferring data to an external apparatus. Examples of such an electronic apparatus include image capture apparatuses as well as computer devices (personal computers, tablet computers, media players, PDAs, and the like), mobile phones, smartphones, game consoles, and the like. These are examples, and some embodiments can be implemented as other electronic devices.

First Embodiment

Figure 1:
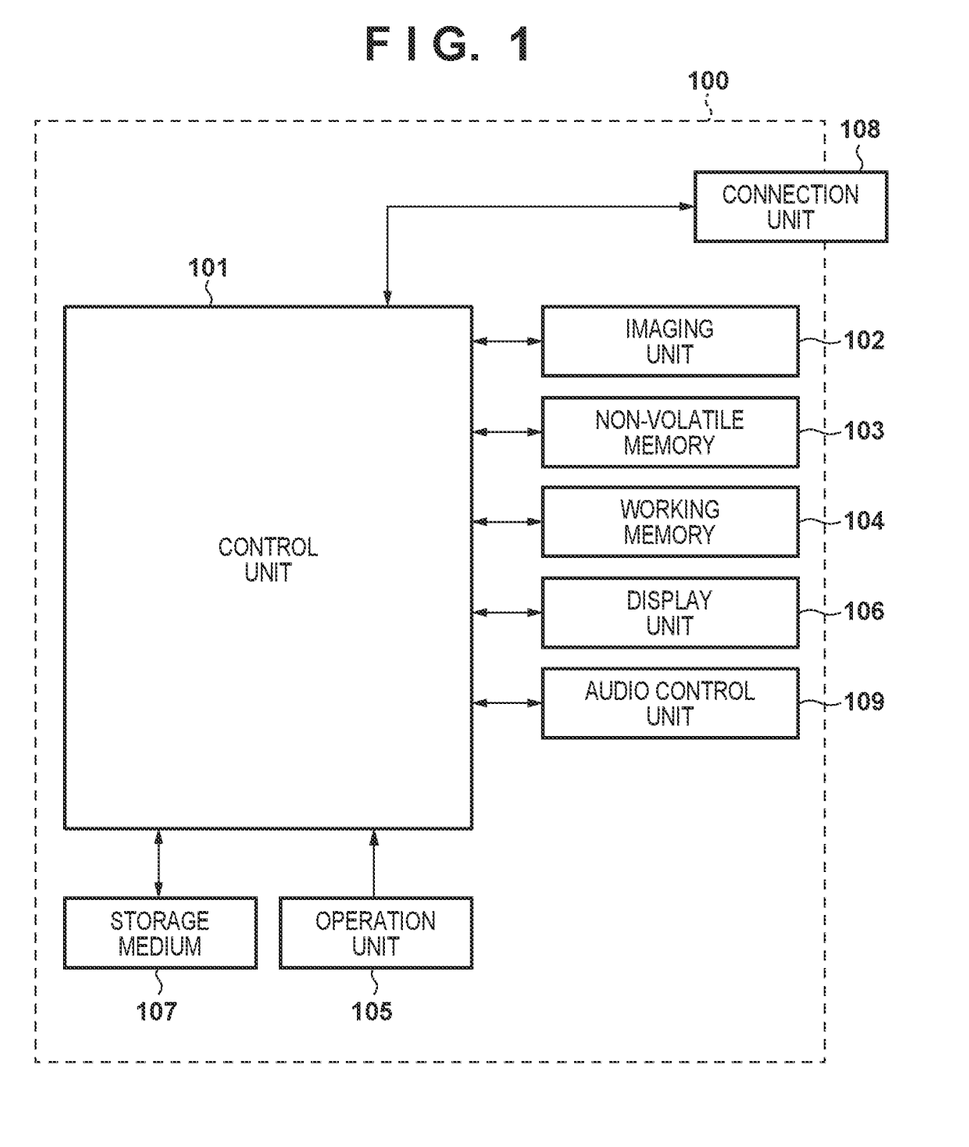
FIG. 1 is a block diagram illustrating an example of the functional configuration of a digital camera representing an example of a communication apparatus according to an embodiment.

FIG. 1 is a block diagram illustrating an example of the functional configuration of a digital camera representing an example of a communication apparatus according to an embodiment of the present disclosure.

A control unit 101 is a processor (CPU, MPU, microprocessor, or the like) that can execute programs, for example. The control unit 101 loads a program stored in a non-volatile memory 103 into a working memory 104 and executes the program to control the operation of the units of a digital camera 100 and implement the various functions of the digital camera 100. The operations described below using the flowchart are also implemented by the processor of the control unit 101 executing a program. Note that at least a part of the operations of the control unit 101 described herein may be implemented by a hardware circuit separate from the processor of the control unit 101.

An imaging unit 102 includes at least a lens for generating an optical image of an object and an image sensor for photoelectric conversion of the optical image generated by the lens. The image sensor, for example, may be a known CCD or CMOS color image sensor including a primary color Bayer array color filter. The image sensor includes a pixel array including a plurality of pixels in a two-dimensional array and a peripheral circuit for reading signals from the pixels. Each pixel accumulates a charge corresponding to the amount of incident light via photoelectric conversion. By reading a signal including voltage corresponding to the amount of charge accumulated in the exposure period from each pixel, the pixel signal group (analog image signal) representing the object image formed on the imaging surface is obtained. In the present embodiment, the image sensor includes an A/D conversion function and outputs digital image signals (RAW image data) obtained via A/D conversion of analog image signals. A/D conversion of analog image signals may be implemented using an A/D converter separate from the image sensor. The image data output by the imaging unit 102 is stored in the working memory 104.

The control unit 101 applies predetermined image processing to the image data and generates a signal or image data according to the application, obtains and/or generates various kinds of information, and the like. The image processing applied by the control unit 101 may include, for example, preprocessing, color interpolation processing, correction processing, detection processing, data modification processing, evaluation value calculation processing, special effects processing, and the like.

The preprocessing may include signal amplification, reference level adjustment, defective pixel correction, and the like.

The color interpolation processing is processing for interpolating values of color components not included in the pieces of pixel data forming the image data that is executed in a case where a color filter is provided in the image sensor. Color interpolation processing may be referred to as demosaic processing.

Correction processing may include various kinds of processing including white balance adjustment, tone correction, correction (image restoration) of image degradation caused by an optical aberration, correction of the effects of lens vignetting, color correction, and the like.

The detection processing may include processing for detecting a feature area (for example, a face area or a human body area) or movement thereof, processing for recognizing a person, and the like.

The data modification processing may include processing including trimming regions (trimming), combining, scaling, encoding and decoding, header information generation (data file generation), and the like. Generating image data for display and image data for storing may also be included in the data modification processing.

The evaluation value calculation processing may include processing including generating signals or evaluation values that are used in automatic focus detection (AF), generating evaluation values that are used in automatic exposure control (AE), and the like.

Special effects processing may include processing including adding a blur effect, changing color tone, relighting, and the like.

Note that these are examples of the processing that can be applied by the control unit 101, and are not intended to limit the processing applied by the control unit 101. Note that the image processing may be implemented using a circuit separate from the control unit 101, such as an application specific integrated circuit (ASIC), a digital signal processor, a graphics processing unit (GPU), or the like.

The control unit 101 stores image data to be stored in a storage medium 107 as a data file in a predetermined format. Also, the control unit 101 stores image data for display in a video memory and causes a display unit 106 to display the image data for display. The video memory may be an area of the working memory 104.

The non-volatile memory 103 is electrically rewritable. The non-volatile memory 103 stores a program executable by the processor of the control unit 101, various setting values for the digital camera 100, GUI data, and the like.

The working memory 104 is used for storing programs executed by the processor of the control unit 101 and variables and is used for temporarily storing image data and the like. Also, a portion of the working memory 104 may be used as the video memory for the display unit 106.

An operation unit 105 is a generic term for an input device (buttons, switches, dials, and the like) that is provided for the user to input various instructions to the digital camera 100. Each of the input devices constituting the operation unit 105 has a name corresponding to the function assigned to it. For example, the operation unit 105 includes a release switch, a moving image recording switch, a shooting mode selection dial for selecting a shooting mode, a menu button, a directional key, an enter key, and the like. The release switch is a switch for recording a still image, and the control unit 101 recognizes a half-pressed state of the release switch as an image capture preparation instruction and a fully-pressed state of the release switch as an image capture start instruction. Also, the control unit 101 recognizes a press of the moving image recording switch during an image capture standby state as a moving image recording start instruction and a press of the moving image recording switch during the recording of a moving image as a recording stop instruction. Note that the functions assigned to the same input device may be variable. Also, the input device may be software buttons or keys using a touch display. The operation unit 105 may also include an input device compatible with non-contact input methods, such as voice input and eye input.

The display unit 106 is a liquid crystal display (LCD), for example, and displays a GUI (e.g., a menu screen), captured or reproduced images, the current state of the digital camera 100, and the like. The display unit 106 may be a display apparatus separate from the digital camera 100.

The storage medium 107 is used as the storage destination for the image data for storing (still image data or moving image data (including audio data)) generated by the control unit 101 on the basis of the image data output by the imaging unit 102. The storage medium 107 is also used as the storage destination for data (for example, audio data) other than the image data for storing generated by the digital camera 100. The storage medium 107 may be a removable media, such as a memory card, or a built-in storage apparatus.

A connection unit 108 is an interface for communicating with external apparatuses. The connection unit 108 has a configuration for executing communication with external apparatuses that is compliant with one or more of any wired and/or wireless communication standard. Examples of such communication standards include, but are not limited to, a USB standard, an HDMI® standard, a wireless LAN standard, a Bluetooth® standard, and the like.

An audio control unit 109 includes a microphone and an A/D converter, for example, and converts audio data of the digital camera 100 from analog data to digital data. The control unit 101 activates the audio control unit 109 when an operation of a record button included on the operation unit 105 is detected, for example. Then, the control unit 101 associates the audio data obtained from the audio control unit 109 with the image data designated in advance. The association method is not particularly limited. One method includes attributing communality to the file name of the audio data stored in the same folder as the image data and the file name of the image data to be associated with the audio data. Also, the audio data may be stored as a part of the image data file.

The digital camera 100 includes a function for transferring image data (for example, image data stored in the storage medium 107) included in the digital camera 100 to an external apparatus connected via the connection unit 108.

Data Transfer Operation

Figure 2:
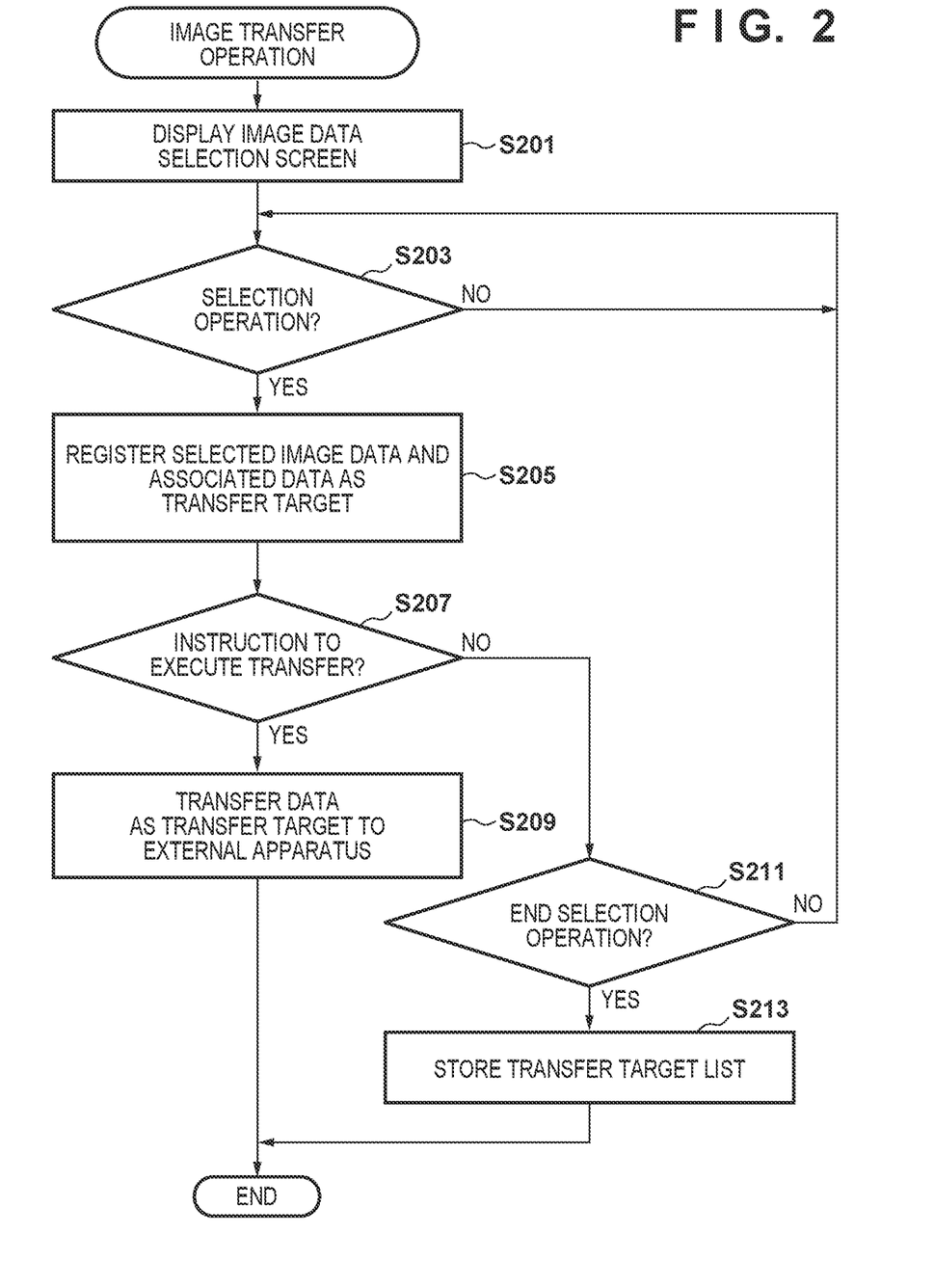
FIG. 2 is a flowchart relating to an image transfer operation according to an embodiment.

FIG. 2 is a flowchart relating to an example of the operations executed by the control unit 101 for implementing the image transfer function for managing image data selected, from among image data stored in the storage medium 107, by a user as data to be transferred and transferring the selected image data to an external apparatus. These operations can be executed when the image transfer item is selected from the menu screen invoked via the operation unit 105, for example, and manual selection is selected as the selection method for the image data to be transferred. Note that this is merely an example, and the control unit 101 may execute the operations in response to a different condition. Also, the transfer destination external apparatus is in a communicable state via the connection unit 108.

Figure 3A:
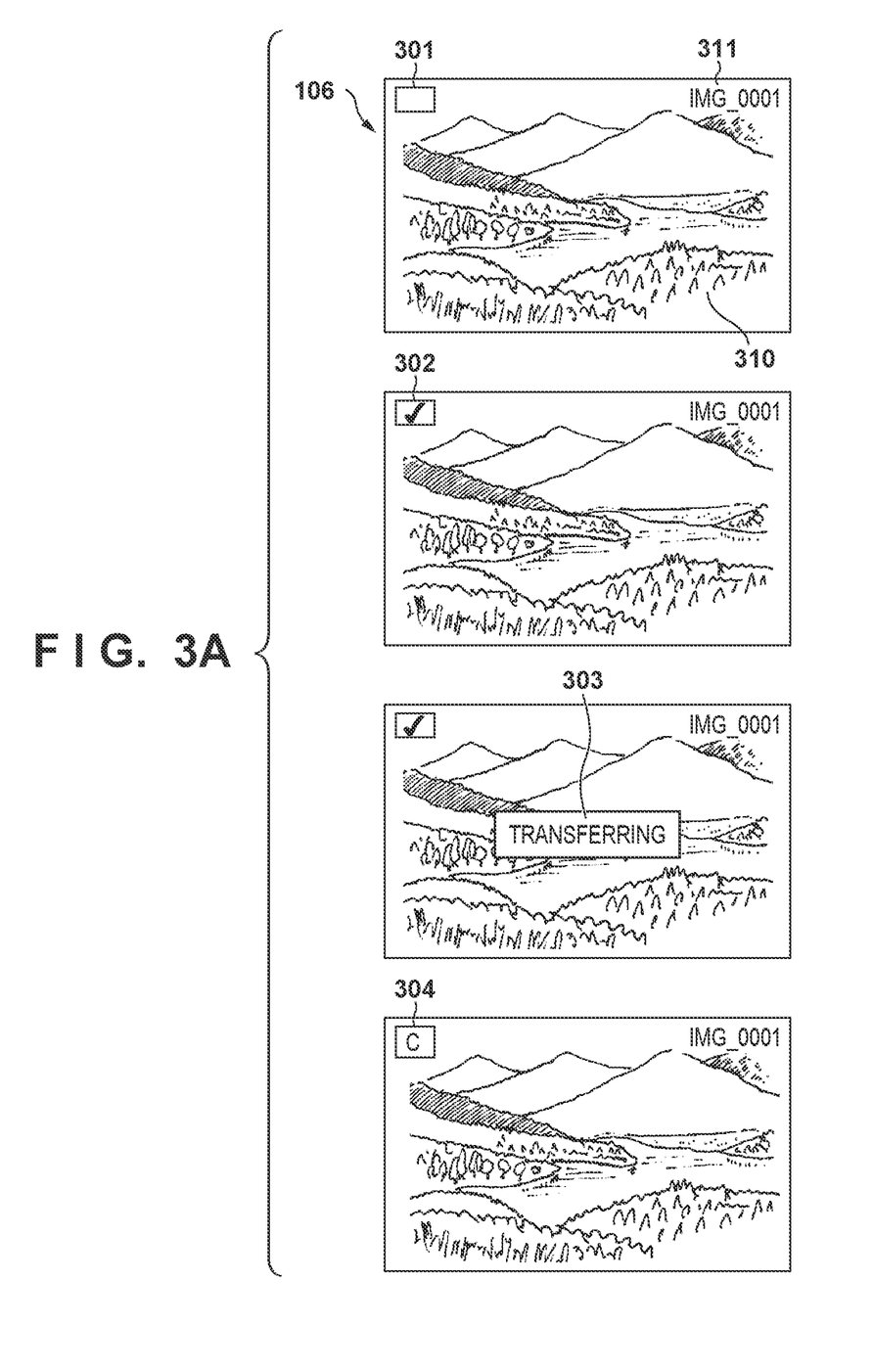
FIG. 3A is a diagram for describing an image transfer operation according to an embodiment.

In step S201, the control unit 101 displays an image selection screen on the display unit 106. The image selection screen may be a screen that selectively displays image data stored in the storage medium 107, for example. Here, as illustrated in FIG. 3A, one thumbnail 310 of the image data is displayed on the display unit 106. However, a plurality of thumbnails may be displayed. A corresponding state indicator 301 and file name 311 are superimposed on each thumbnail. The state indicator 301 is an indicator indicating whether or not the image data displayed by the corresponding thumbnail is registered or managed as a transfer target and, in a case where the transfer target is registered or managed, indicates whether it has or has not been transferred. Note that the file name 311 may be displayed including an extension.

In step S203, the control unit 101 determines whether or not there has been a selection operation via the operation unit 105. A selection operation is an instruction to register the image data displayed as a thumbnail in a selected state as a transfer target. For example, the control unit 101 can detect the operation of an OK button included on the operation unit 105 as a selection operation. As in the example illustrated in FIG. 3A, in a case where there is one thumbnail displayed on the display unit 106, the control unit 101 considers the displayed thumbnail to be in a selected state. In a case where a plurality of thumbnails are displayed at once, for each thumbnail, a selected state and a not-selected state can be switched between via an operation other than an operation of the OK button.

When it is determined in step S203 that a selection operation has been performed, the control unit 101 executes step S205, and when it is determined that no selection operation has been performed, step S203 is repeatedly executed. Note that in a case where an operation other than the selection operation is detected, the control unit 101 can execute an operation in accordance with the detected operation. For example, when a switch operation for a thumbnail displayed on the display unit 106 is detected, the control unit 101 switches the displayed thumbnail.

In step S205, the control unit 101 registers the image data displayed by the thumbnail in a selected state as a transfer target. Specifically, the control unit 101 adds identification information (for example, the file name) of the image data to a transfer target list for managing data as transfer target. Note that the data as a transfer target can be managed without using a transfer target list. For example, information for managing data as a transfer target may be recorded as metadata in a data file that contains data as a transfer target, for example.

Also, depending on the settings, the control unit 101 also registers data being associated with image data that is to be registered as a transfer target as a transfer target. Accordingly, in the case of a setting for making associated data also a transfer target, if audio data is associated with image data registered as a transfer target, the audio data is also automatically registered as a transfer target. In a case where the associated data is registered as a transfer target, the control unit 101 adds identification information of the data to the transfer target list.

The transfer target list may be a list in which the data identification information and management information including the transfer state (not transferred, transferred, transfer error) are associated together. The control unit 101 stores the transfer target list in the non-volatile memory 103, for example, and updates it as appropriate. In the case of not using the transfer target list, management information may be recorded as, for example, metadata in a data file that contains data as a transfer target, for example.

The control unit 101 changes the form of the state indicator 301 attached to the thumbnail for the image data registered as a transfer target. In this manner, the user can confirm that the image data indicated by the displayed thumbnail is being managed as a transfer target. A state indicator 302 in FIG. 3A indicates an example of a form indicating a transfer target and not transferred.

In step S207, the control unit 101 determines whether or not an execute transfer instruction has been input via the operation unit 105. For example, the control unit 101 can detect the operation of a transfer button included on the operation unit 105 as the input of an execute transfer instruction. If it is determined that an execute transfer instruction has been input, the control unit 101 executes step S209. If it is not determined that an execute transfer instruction has been input, the control unit 101 executes step S211.

In step S209, the control unit 101 transfers the data being managed as a transfer target, specifically, the data registered in the transfer target list, to an external apparatus. In the present embodiment, the data is transferred according to the file transfer protocol (FTP). Note that the data transfer method may be different depending on at least one of the external apparatus or the connection method.

The control unit 101 changes the transfer state of the management information for the data of which transfer has started from not transferred to transfer in progress. Also, when the transfer processing starts, the control unit 101 displays a display indicating that transfer processing is in progress, for example, a message 303 illustrated in FIG. 3A, on the display unit 106. Also, the control unit 101 changes the form of the thumbnail state indicator to a form indicating transfer in progress or a form indicating the transfer result when transfer of the image data (including the associated data) displayed on the display unit 106 by a thumbnail is in progress or complete. A state indicator 304 illustrated in FIG. 3A is an example of a form indicating the transfer result (transferred). When all of the data managed as a transfer target have been transferred to an external apparatus, the control unit 101 ends the operations of the flowchart illustrated in FIG. 2.

In step S211, the control unit 101 determines whether or not an end selection operation has been detected via the operation unit 105. The control unit 101 can detect an operation to end the image transfer operation, for example, an operation to clear the menu screen or the like, as an end selection operation. When it is determined that an end selection operation has been detected, the control unit 101 stores the transfer target list in the non-volatile memory 103 (or updates the transfer target list stored in the non-volatile memory 103). Then, the control unit 101 ends the operations of the flowchart illustrated in FIG. 2 and executes step S203 if it is determined that an end transfer operation has been detected. Note that in the case of managing the data as a transfer target without using a transfer target list, a transfer target list storage and update operations are not required.

Audio Data Association Operation

Next, an audio memo function for recording audio and associating it with stored image data will be described. The audio memo function is a function for associating audio data stored when the digital camera 100 operates in playback mode with stored image data, for example. The control unit 101 activates the audio control unit 109 when an operation of a record button included on the operation unit 105 is detected, for example. Accordingly, the microphone included in the audio control unit 109 is activated, and audio data is generated.

The control unit 101 stores the audio data obtained from the audio control unit 109 in the working memory 104. When an operation of the record button is detected during recording, the control unit 101 deactivates the audio control unit 109 and ends recording. Then, the control unit 101 generates an audio data file storing the audio data stored in the working memory 104 and stores this in the storage medium 107.

The control unit 101 stores the audio data in association with the image data stored in the storage medium 107. The image data associated with the audio data may be image data of the thumbnail displayed on the display unit 106 when audio data recording is started or may be image data designated by a user before or after the start of recording. The control unit 101 can store the image data and the audio data in the same folder and store the audio data with the same file name (extension excluded) as the image data to associate the audio data with the image data. Association may be performed by a different method, such as storing the file name of the audio data as metadata of the image data file, embedding the audio data in the image data file, and the like.

Immediate Transfer Operation for Image Data with Audio Memo

Figure 4:
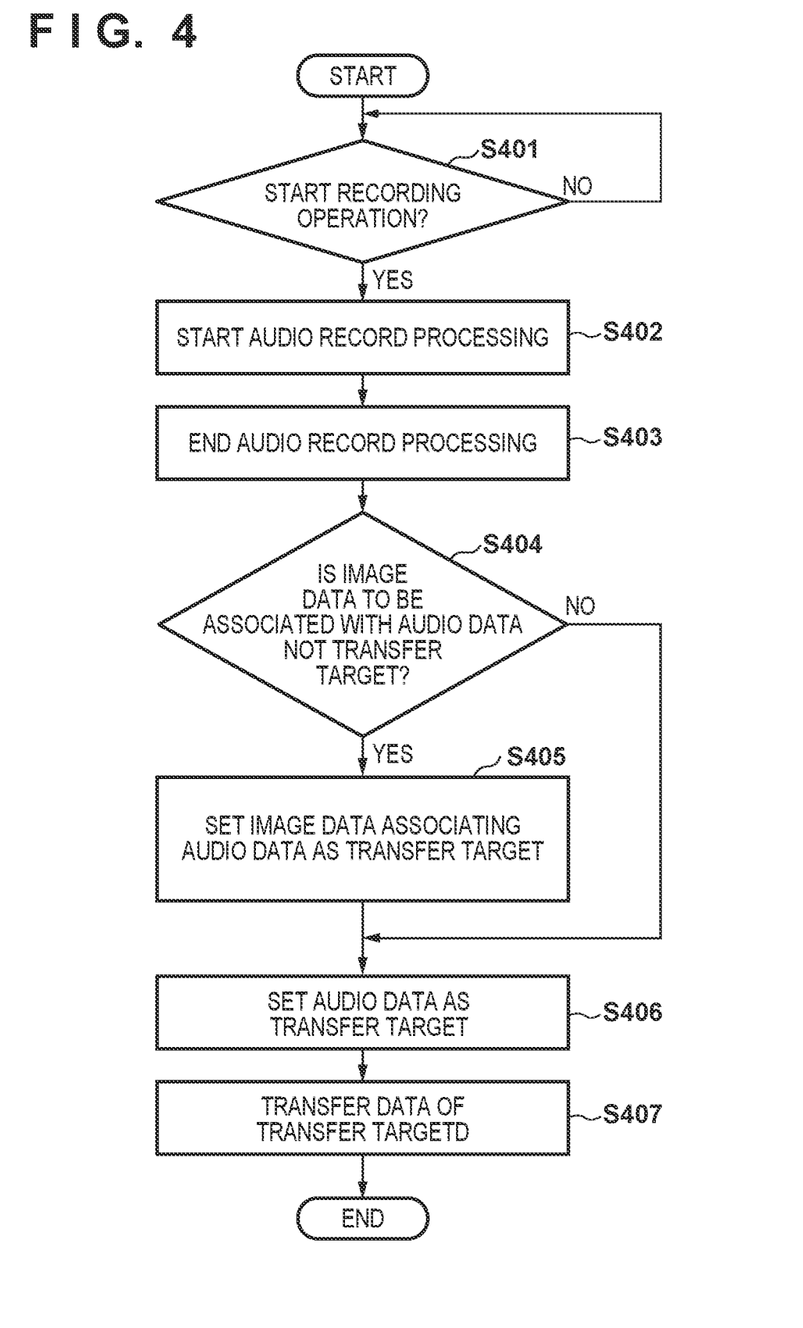
FIG. 4 is a flowchart relating to an immediate transfer function according to a first embodiment.

Next, operations of the control unit 101 relating to immediate transfer provided by the digital camera 100 as one of the audio memo functions will be described using the flowchart illustrated in FIG. 4. Immediate transfer is a function for transferring the audio data and the image data to be associated with the audio data to an external apparatus immediately after the recording of an audio memo.

In step S401, the control unit 101, in an audio memo recordable state, determines whether or not a start recording operation has been detected. An audio memo recordable state is a predetermined state, such as a state in which the digital camera 100 is operating in playback mode, for example. For example, when an operation of the record button included on the operation unit 105 is detected, the control unit 101 determines that a start recording operation has been detected. If it is determined that a start recording operation has been detected, the control unit 101 executes step S402. If it is not determined that a start recording operation has been detected, the control unit 101 repeatedly executes step S401.

In step S402, the control unit 101 activates the audio control unit 109 and starts record audio processing. Accordingly, the microphone included in the audio control unit 109 is activated, and audio data generation by the audio control unit 109 is started. The generated audio data is supplied to the control unit 101.

Figure 3B:
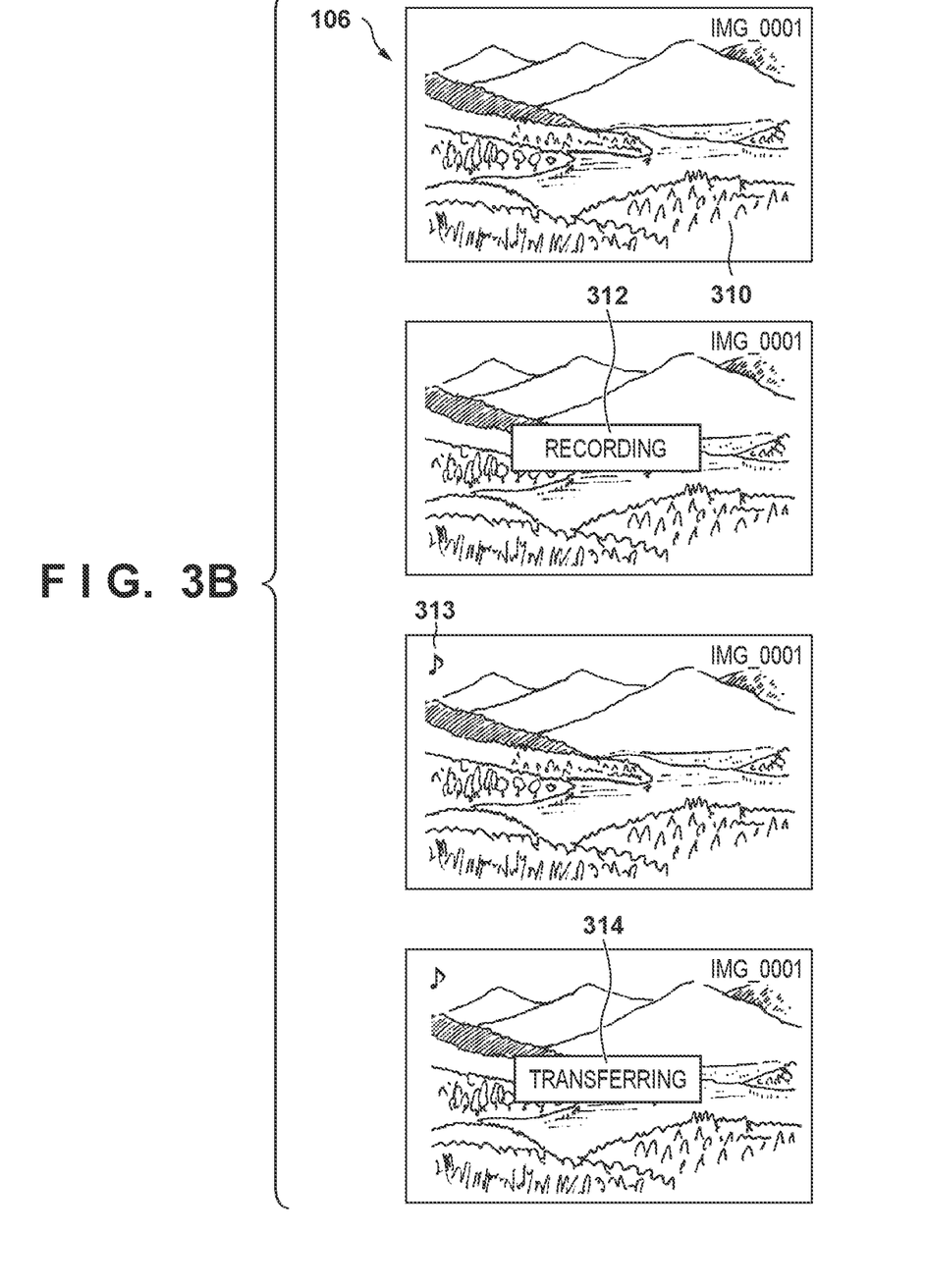
FIG. 3B is a diagram for describing an image transfer operation according to an embodiment.

The control unit 101 stores the audio data supplied from the audio control unit 109 in the working memory 104. Note that the control unit 101 may perform a display indicating that recording is in progress. For example, as illustrated in FIG. 3B, when recording is started with the thumbnail 310 displayed on the display unit 106, the control unit 101 can display a message 312 and the like and notify the user of that recording is in progress via a display. In this manner, the user can start speaking the contents to be stored as an audio memo towards the microphone of the digital camera 100.

Thereafter, in step S403, the control unit 101 deactivates the audio control unit 109 in response to a recording end condition being satisfied and ends the recording processing. A recording end condition may be that an operation of the record button has been detected by the control unit 101 during recording, that the recording time has reached a predetermined maximum recording time, or the like, for example. When the recording processing ends, the control unit 101 generates an audio data file storing the audio data stored in the working memory 104 and stores this in the storage medium 107.

Also, in a case where a thumbnail of image data to be associated with the recorded audio data is displayed on the display unit 106, the control unit 101 may perform a display indicating that audio data association is complete. In the example illustrated in FIG. 3B, an indicator 313 is an example of a display indicating that audio data association is complete.

In step S404, the control unit 101 determines whether or not the image data to be associated with the stored audio data is being managed as a transfer target. Note that hereinafter, the data to be managed (or being managed) as a transfer target is simply referred to as data as a transfer target. For example, the control unit 101 can determine whether or not data is a transfer target by searching for whether the identification information of the data is registered in the transfer target list, for example. Note that in this example, image data to be associated with an audio memo is designated when recording starts. However, if there is no designation, in step S404, the control unit 101 makes the user designate data by displaying an image data selection screen on the display unit 106 or the like.

If it is determined that the image data to be associated with the stored audio data is a transfer target, the control unit 101 executes step S406. If it is not determined that the image data is a transfer target, the control unit 101 executes step S405.

In step S405, the control unit 101 sets the image data to be associated with the stored audio data as a transfer target and executes step S406.

In step S406, the control unit 101 sets the stored audio data as a transfer target and executes step S407.

In step S407, the control unit 101 transfers the data of a transfer target to an external apparatus via the connection unit 108. The control unit 101 changes the management information in the transfer target list for the data being transferred from not transferred to transfer in progress. Also, in a case where a thumbnail of the image data being transferred is displayed on the display unit 106, the control unit 101 may perform a display indicating that transfer is in progress. In the example illustrated in FIG. 3B, a message 314 is an example of a display indicating that the data transfer is in progress.

The control unit 101 changes the management information in the transfer target list for the data that has been transferred from transfer in progress to transferred (or transfer error). When transfer of the audio data and the image data associated with the audio data is complete, the control unit 101 ends the immediate transfer operation illustrated in FIG. 4. Also, the control unit 101 ends the display of the message 314.

The digital camera 100 according to the present embodiment provides a function for, when operations for newly storing data to be associated with stored data are executed, the immediate transfer of both pieces of data to an external apparatus. At this time, in a case where the stored data is not a transfer target, the stored data is automatically set as a transfer target. Thus, the required data can be transferred to an external apparatus without the user needing to re-register the data as a transfer target or issuing an instruction to start transfer to an external apparatus, allowing good user-friendliness to be achieved.

Second Embodiment

Next, the second embodiment of the present disclosure will be described. The present embodiment corresponds to a modified example of the immediate transfer operation of the audio memo function described in the first embodiment. Thus, the descriptions in common with the first embodiment will be omitted, and only differences will be focused on.

Figure 5:
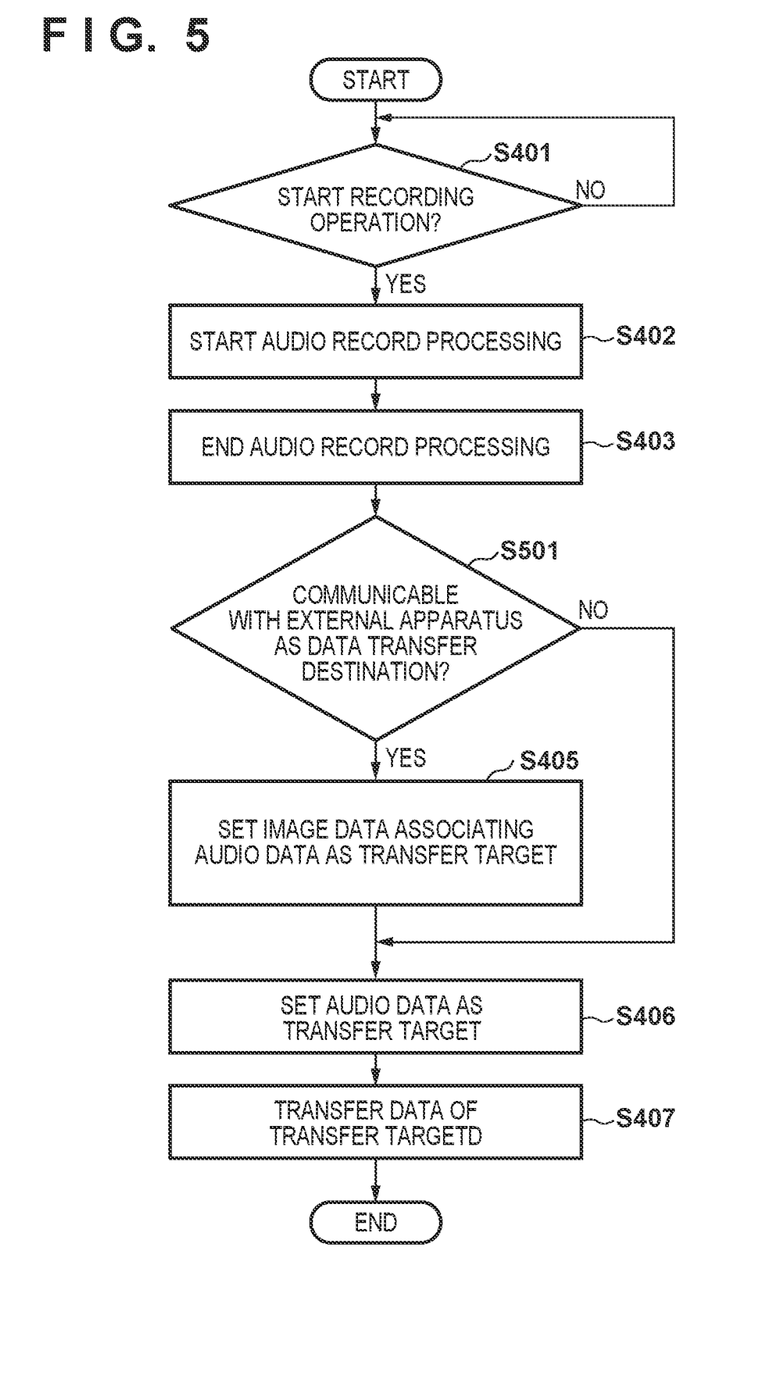
FIG. 5 is a flowchart relating to an immediate transfer function according to a second embodiment.

FIG. 5 is a flowchart indicating the operations of the control unit 101 relating to the immediate transfer provided by the digital camera 100 as one of the audio memo functions according to the present embodiment. Processes for executing the same processing as in the first embodiment are given the same reference number as in FIG. 4 and description is omitted.

In the present embodiment, after the recording processing in step S403 is complete, in step S501, the control unit 101 determines whether or not the control unit 101 is in a communicable state with the external apparatus designated as the data transfer destination. If it is determined to be in a communicable state with the transfer destination external apparatus, the control unit 101 executes the operations of step S405 onward as in the first embodiment.

On the other hand, in a case where it is not determined to be in a communicable state with the transfer destination external apparatus, the control unit 101 cannot perform immediate transfer and thus ends the operation. In this case, the control unit 101 notifies the user that communication with the external apparatus cannot be performed via a message display or the like. Also, in the example illustrated in FIG. 5, operations are immediately ended, but steps S405 to S406 may be executed and the operation may be ended after setting the audio data and the image data as a transfer target.

In the present embodiment, in a case where immediate transfer cannot be performed, the newly generated data is stored in association with stored data and the processing ends. Thus, the user can select to execute the processing until the immediate transfer depending on whether or not communication with the external apparatus can be performed or to execute the processing until the data association. Also, in a case where immediate transfer cannot be performed, the generated data and the data to be associated with the generated data are automatically set as a transfer target, allowing the effort involved in re-registering the data as a transfer target to be reduced.

Third Embodiment

Next, a third embodiment of the present disclosure will be described. In the first and second embodiment, the case of storing audio data to be associated with image data is premised with the immediate transfer of the audio data and the associated image data. The present embodiment is different from the second embodiment in that whether or not to execute immediate transfer can be set. Thus, the descriptions in common with the first and second embodiments will be omitted, and only differences will be focused on.

Figure 6:
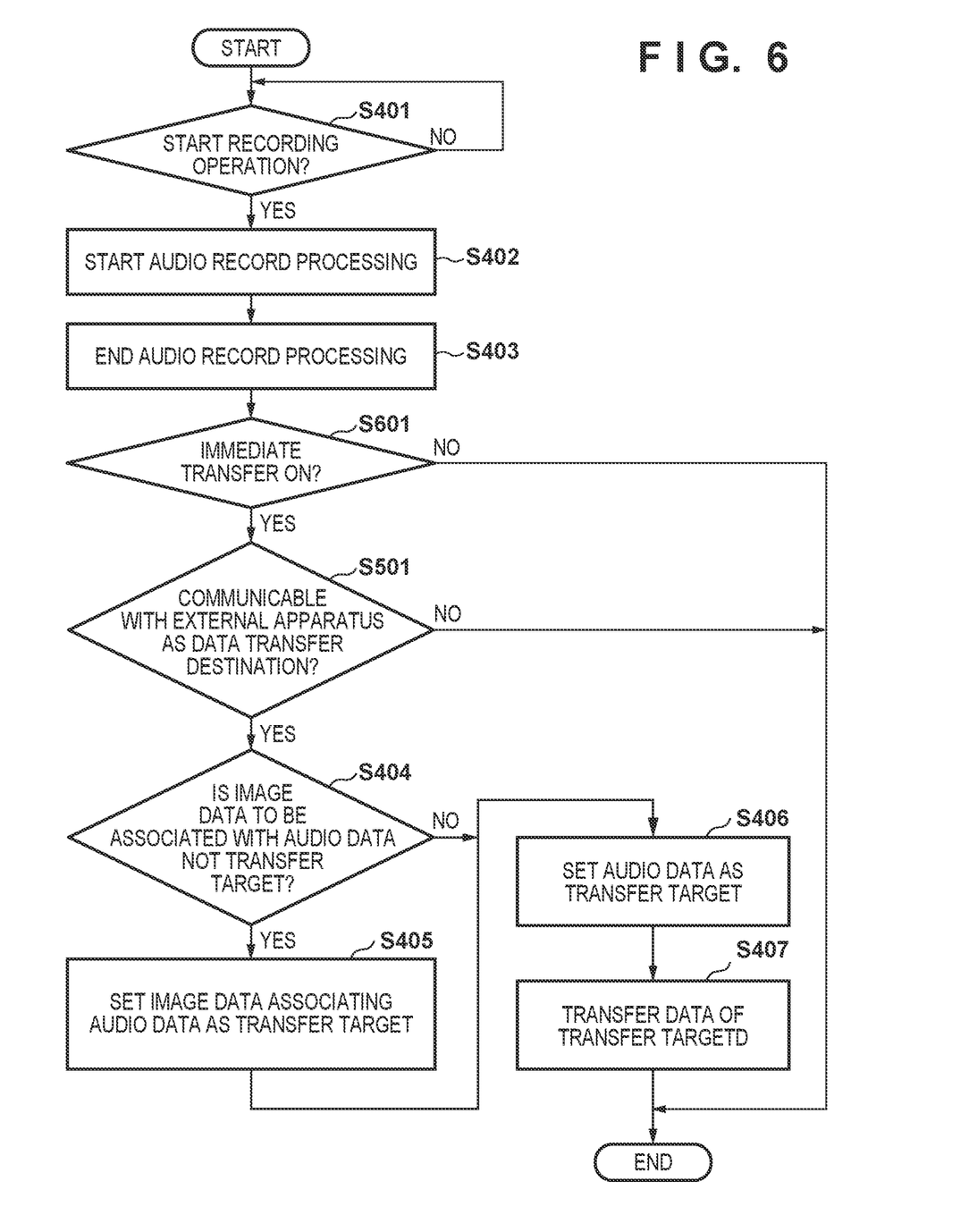
FIG. 6 is a flowchart relating to an immediate transfer function according to a third embodiment.

FIG. 6 is a flowchart indicating the operations of the control unit 101 relating to the audio memo function provided by the digital camera 100 according to the present embodiment. Processes for executing the same processing as in the first and second embodiment are given the same reference number as in FIGS. 4 and 5 and description is omitted.

Figure 7:
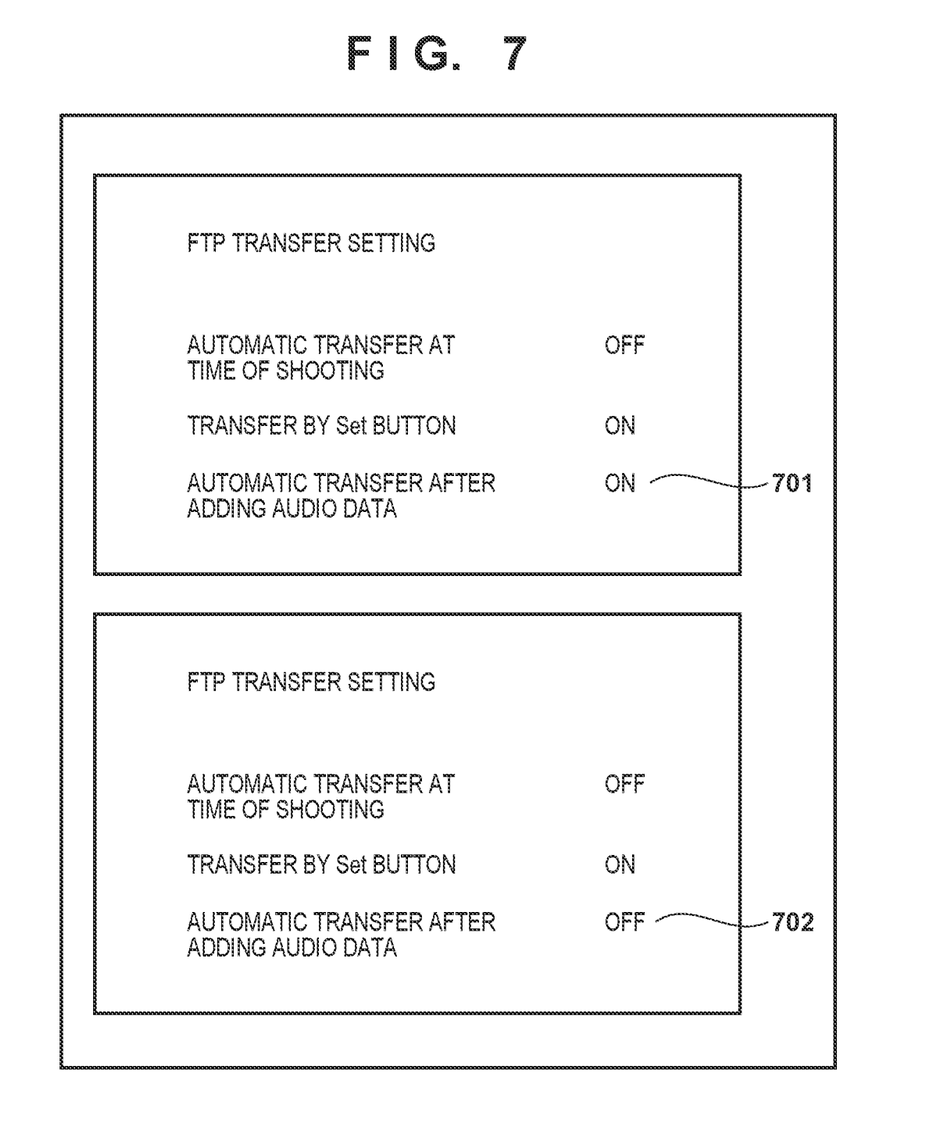
FIG. 7 is a diagram for describing an immediate transfer function according to the third embodiment.

FIG. 7 is a diagram illustrating an example of a settings screen for a transfer operation for the digital camera 100 according to the present embodiment. As illustrated in FIG. 7, the settings screen includes items for setting automatic (immediate) transfer to be performed (ON 701) or not (OFF 702) when audio data is stored in association with image data.

In the present embodiment, after the recording processing in step S403 is complete, in step S601, the control unit 101 determines whether or not to set immediate transfer to ON (execute). Then, if it is determined that immediate transfer is set to ON, the control unit 101 executes the operations of step S501 onward as in the second embodiment.

On the other hand, if it is not determined that immediate transfer is ON (determined to be set to OFF), the control unit 101 ends the operation. Accordingly, processing until the operation (providing an audio memo) for storing the audio data in association with the image data is executed.

Note that in the present embodiment as in the second embodiment, in a case where it is not determined in step S501 that there is a communicable state with the transfer destination external apparatus, steps S404 to S406 may be executed and the operation may be ended after the audio data and the image data are set to as a transfer target. In the present embodiment, step S501 is executed in a case where it is determined that immediate transfer is set to ON. Thus, it can be considered that the user intends to execute immediate transfer. Accordingly, by ending the operations after setting the audio data and the image data as a transfer target, the effort involved in re-registering the data as a transfer target when communication with the transfer destination external apparatus becomes possible is reduced and user-friendliness can be improved.

In the present embodiment, in a case where immediate transfer is set to OFF, irrespective of whether or not the external apparatus can be communicated with, newly generated data is stored in association with stored data and the processing ends. Thus, the user can select whether to execute the processing until immediate transfer when data to be associated with stored data is generated or whether to execute the processing until data association by changing the immediate transfer setting. Also, in a case where immediate transfer cannot be performed, the generated data and the data to be associated with the generated data are automatically set as a transfer target, allowing the effort involved in re-registering the data as a transfer target to be reduced.

Other Embodiments

The embodiments of the present disclosure described above have related to the audio memo function for associating newly generated audio data with stored image data. However, various embodiments can be implemented irrespective of the type of stored data and the type of data to be associated with the stored data.

In the second embodiment and the third embodiment, in a case where immediate transfer cannot be performed due to being unable to communicate with the external apparatus, the control unit 101 may automatically execute transfer of the transfer target data for immediate transfer at the point in time when communication with the external apparatus becomes possible.

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-046970, which was filed on Mar. 23, 2023 and which is hereby incorporated by reference herein in its entirety.

What is claimed is:

1. A communication apparatus comprising:
   one or more processors that execute computer-executable instructions stored in a memory and thereby function as:
   a generating unit configured to generate second data to be associated with first data being stored; and
   a controlling unit configured to control transfer of data that is registered or managed as a transfer target to an external apparatus, wherein
   the controlling unit
      can execute immediate transfer in which the second data and the first data to be associated with the second data are transferred to the external apparatus in response to generation of the second data as a transfer target by the generating unit, and
      when executing the immediate transfer, if the first data to be associated with the second data is not a transfer target, sets the first data as a transfer target and then transfers the first data together with the second data to the external apparatus.

2. The communication apparatus according to claim 1, wherein
   the controlling unit
      executes the immediate transfer in a case where executing the immediate transfer is set in the communication apparatus, and in a case where executing the immediate transfer is not set in the communication apparatus, stores the second data in association with the first data and does not execute the immediate transfer.

3. The communication apparatus according to claim 1, wherein
the controlling unit does not execute the immediate transfer in a case where communication with the external apparatus cannot be performed.

4. The communication apparatus according to claim 3, wherein
in a case where communication with the external apparatus cannot be performed, the controlling unit
sets the second data as a transfer target, and
if the first data is not a transfer target to be associated with the second data, sets the first data as a transfer target.

5. The communication apparatus according to claim 3, wherein
in a case where the controlling unit did not execute the immediate transfer because communication with the external apparatus was not able to be performed, the controlling unit transfers the second data and the first data that were to be transferred by the immediate transfer that was not executed to the external apparatus when communication with the external apparatus becomes able to be performed.

6. The communication apparatus according to claim 1, wherein
the controlling unit controls the transfer of data using a list in which one or more of data as a transfer target is/are registered.

7. The communication apparatus according to claim 1, wherein
the controlling unit controls the transfer of data using management information recorded as metadata in a data file that contains data as a transfer target.

8. The communication apparatus according to claim 1, wherein the first data is image data, and the second data is audio data.

9. The communication apparatus according to claim 8, wherein the communication apparatus is an image capture apparatus.

10. A control method executed by a communication apparatus, the control method comprising:
generating second data to be associated with first data being stored; and
controlling transfer of data that is registered or managed as a transfer target to an external apparatus, wherein
the controlling includes
executing immediate transfer in which the second data and the first data to be associated with the second data are transferred to the external apparatus in response to generation of the second data as a transfer target, and
when executing the immediate transfer, if the first data to be associated with the second data is not a transfer target, setting the first data as a transfer target and then transferring the first data together with the second data to the external apparatus.

11. A non-transitory computer-readable medium storing computer-executable instructions which, when executed by one or more processors equipped in an electronic device, cause the electronic device to function as a communication apparatus comprising:
a generating unit configured to generate second data to be associated with first data being stored; and
a controlling unit configured to control transfer of data that is registered or managed as a transfer target to an external apparatus, wherein
the controlling unit
can execute immediate transfer in which the second data and the first data to be associated with the second data are transferred to the external apparatus in response to generation of the second data as a transfer target by the generating unit, and
when executing the immediate transfer, if the first data to be associated with the second data is not a transfer target, sets the first data as a transfer target and then transfers the first data together with the second data to the external apparatus.

* * * * *